Figure 1:
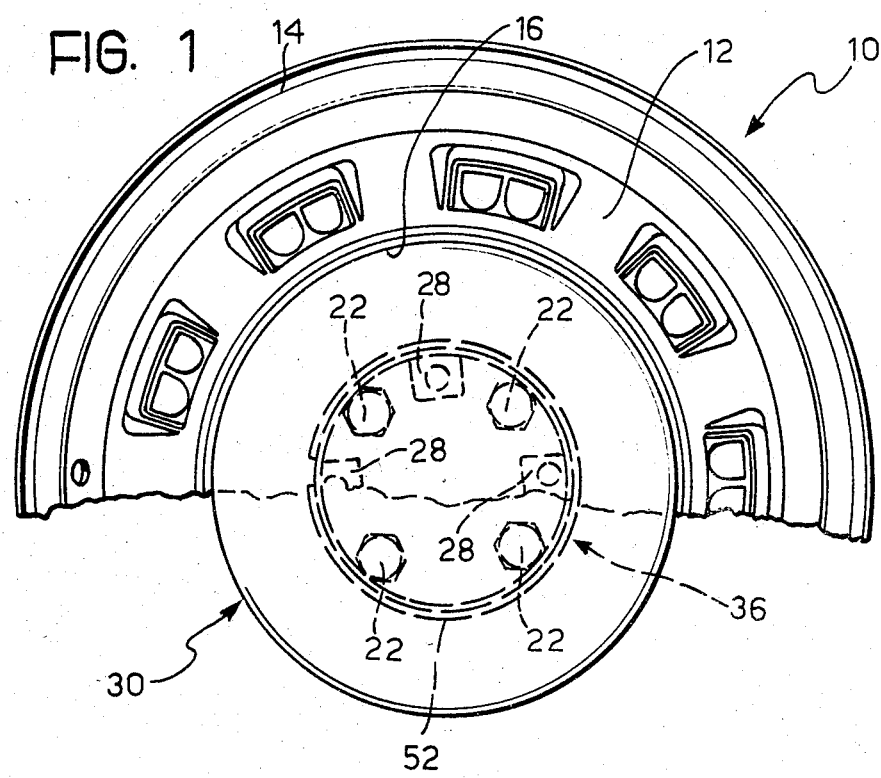

United States Patent [19]

Abbate Daga

[11] Patent Number: 4,547,021
[45] Date of Patent: Oct. 15, 1985

[54] HUB CAP SECURING ARRANGEMENT ENGAGING WHEEL LUGS

[75] Inventor: Silvano Abbate Daga, Turin, Italy

[73] Assignee: Fiat Auto S.p.A., Turin, Italy

[21] Appl. No.: 544,287

[22] Filed: Oct. 21, 1983

[30] Foreign Application Priority Data

Nov. 17, 1982 [IT] Italy ............................. 53939/82[U]

[51] Int. Cl.⁴ .................... B60B 7/06; B60B 27/00
[52] U.S. Cl. ........................ 301/37 P; 301/37 TP; 301/108 A
[58] Field of Search ............ 301/37 P, 37 R, 37 TP, 301/37 S, 108 A, 108 S

[56] References Cited

U.S. PATENT DOCUMENTS 4,217,003  9/1980  Main ................................ 301/37 P

FOREIGN PATENT DOCUMENTS 2054483  2/1981  United Kingdom .

Primary Examiner—David A. Scherbel
Assistant Examiner—Mark J. Abate
Attorney, Agent, or Firm—Bacon & Thomas

[57] ABSTRACT

A disc wheel for motor vehicles, including a disc defining equi-angularly spaced holes, screws for fixing the wheel to its support and engageable in said holes, and a hub cap attached to the disc, the improvement consists in the disc and the hub cap having cooperating bayonet-type connection means for connecting the hub cap to the fixing screws of the wheel.

7 Claims, 9 Drawing Figures

HUB CAP SECURING ARRANGEMENT ENGAGING WHEEL LUGS

The present invention relates to disc wheels for motor vehicles, in which the disc has angularly spaced holes for the engagement of screws for fixing the wheel to its support and in which a hub cap is fitted to the disc.

In conventional wheels of this type, the hub cap is generally provided with holes and is attached to the wheel disc by means of the fixing screws for the wheel, which are engaged in the holes.

With this solution, the operations of fixing and detaching the hub cap are inconvenient and anything but easy since these operations obviously involve manipulation of the screws which fix the wheel.

It has also been proposed to connect the hub cap to the disc by means of a simple press-fit or snap-engagement by providing the two members with mutually coupling parts.

Even with this solution, the removal of the hub cap is anything but easy since it is necessary to use considerable force or a lever tool which must be wedged between the hub cap and the rim.

The object of the present invention is to avoid these disadvantages and to provide a motor vehicle wheel of the type defined above, in which the coupling of the hub cap to the disc of the wheel is such as to ensure its convenient and easy attachment and detachment without requiring either the removal of the fixing screws for the wheel or the use of special tools, while at the same time ensuring a firm vibration-free connection.

In order to achieve this object, the present invention provides a disc wheel for motor vehicles of the type defined at the beginning, characterised in that the disc of the wheel and the hub cap are provided with cooperating means for attaching the hub cap to the fixing screws of the wheel by a bayonet-type connection.

Since the fixing screws for the wheel usually have a head and a shaft connected by a part with a conical surface diverging towards the head, the disc according to the invention is provided with a plurality of raised portions between the apertures for the fixing screws and angularly spaced like these apertures, and the hub cap is constituted by a disc having a ring of axially resilient sectors on its inner face, the sectors having recesses in their free edges which are disposed angularly like the raised portions of the disc of the wheel and retaining teeth which are interposed between the recesses and are adapted for the resilient engagement of the conical parts of the fixing screws for the wheel as a result of a rotation of the hub cap relative to the disc from a position in which the recesses are disposed in angular correspondence with the fixing screws to a position in which the recesses are engaged by the raised portions of the disc.

Preferably, the ring of resilient sectors of the hub cap is surrounded by a resilient circumferential member which, to advantage, may be constituted by a metal split-ring.

Figure 2:
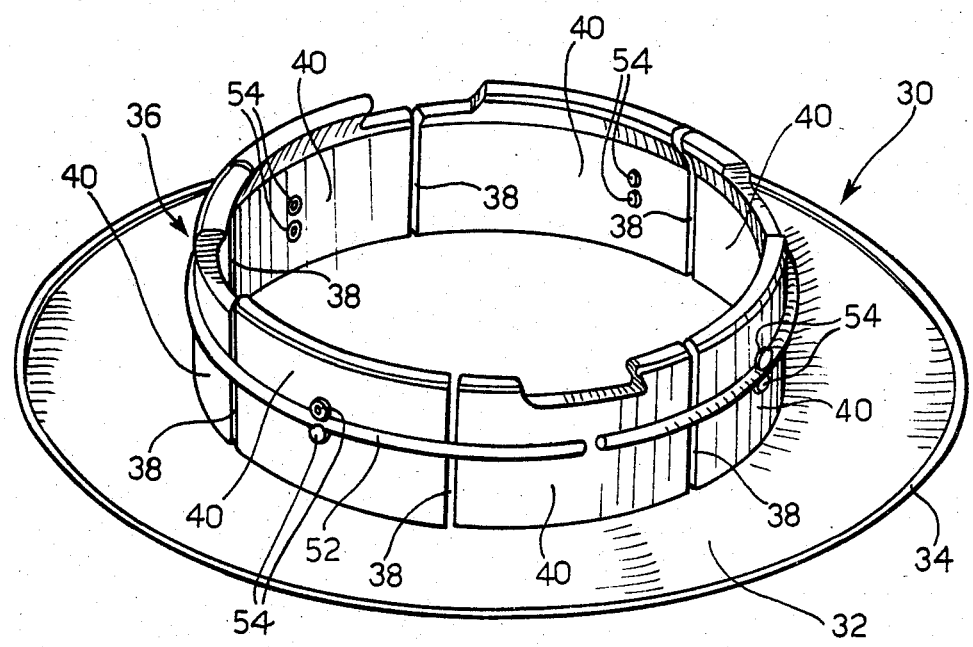
Figure 3:
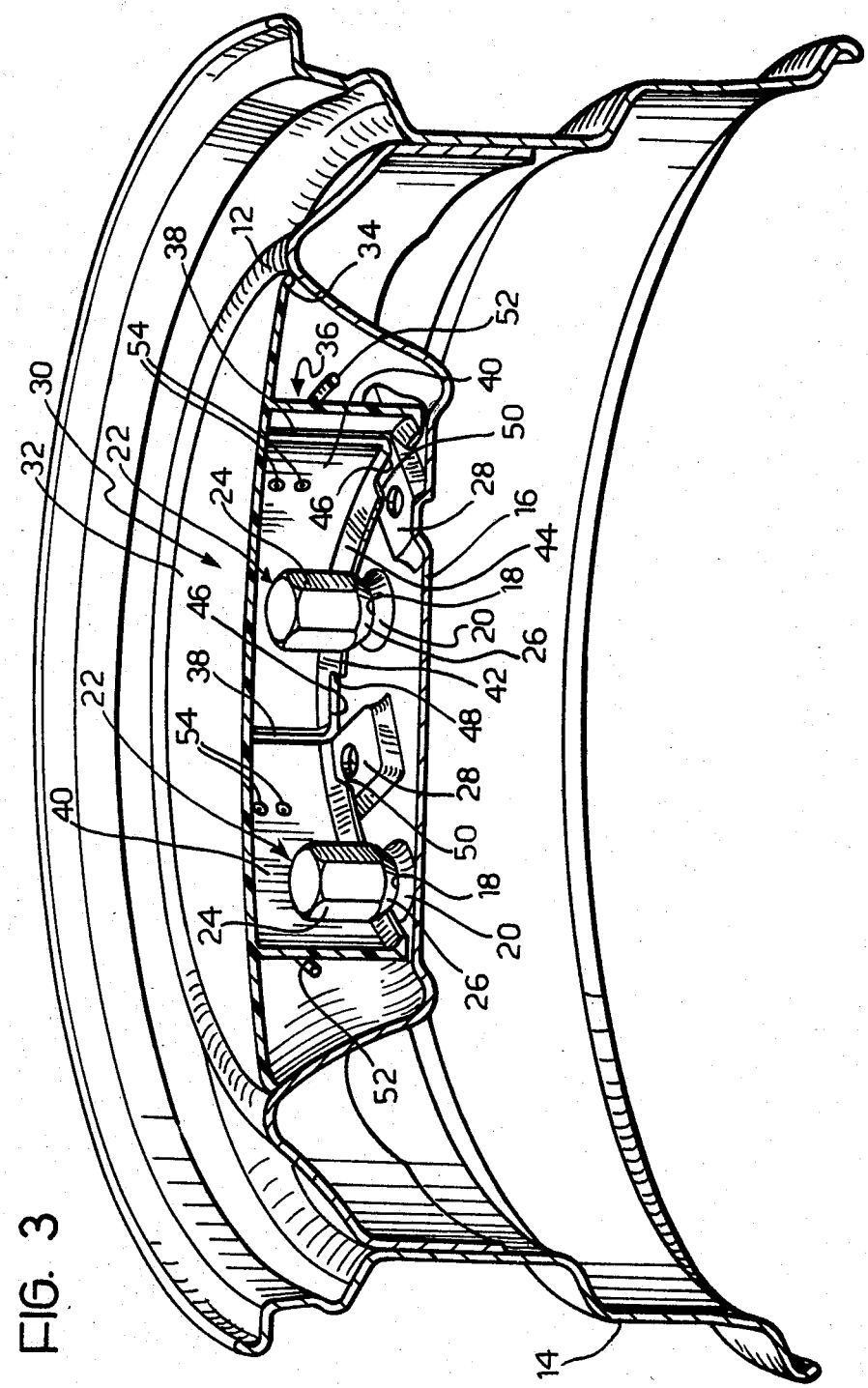
Figure 4:
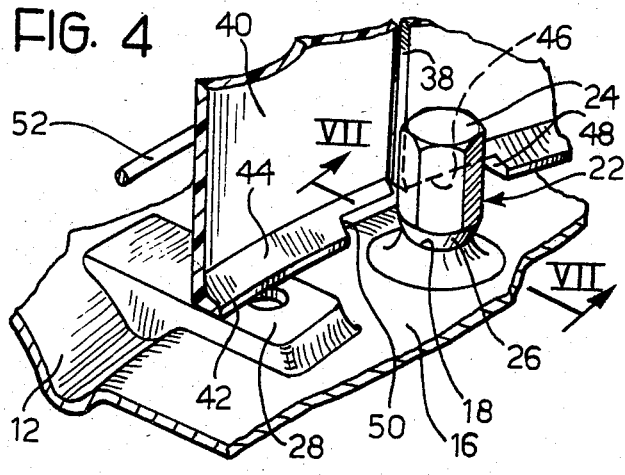
Figure 7:
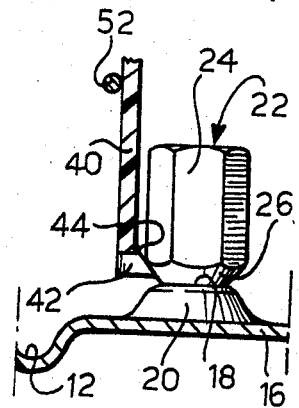
Figure 5:
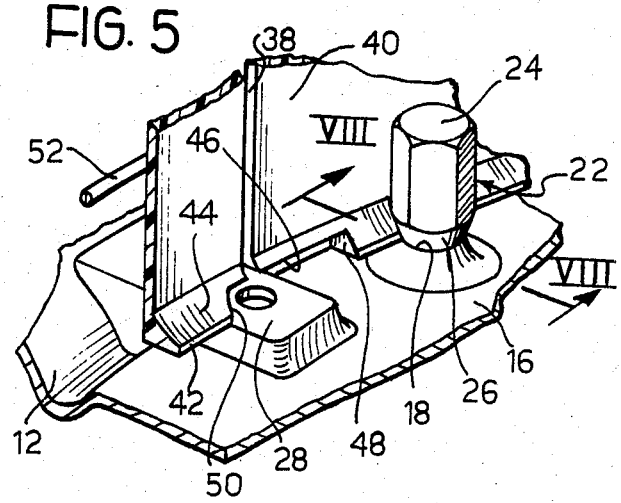
Figure 8:
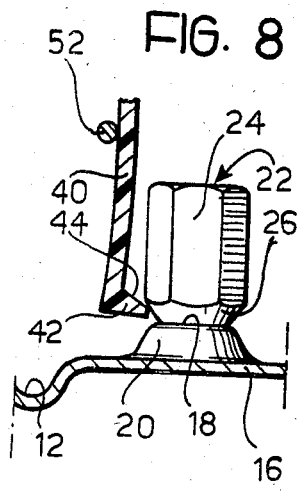
Figure 6:
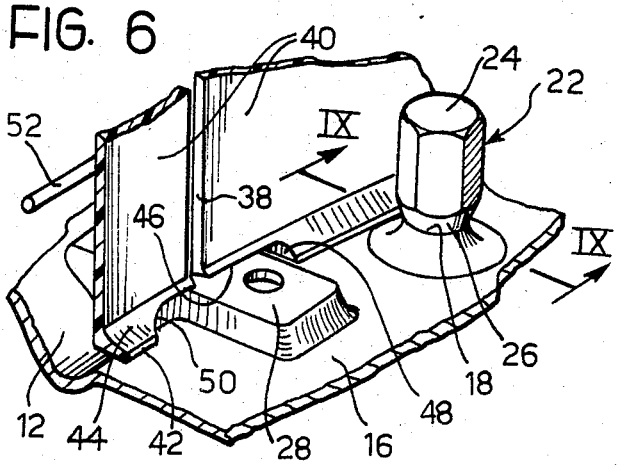
Figure 9:
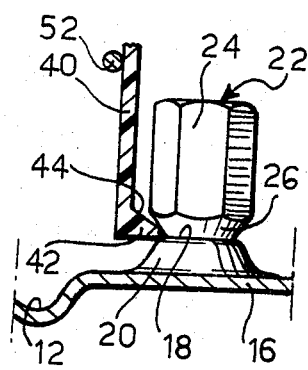

Further characteristics and advantages of the invention will become clear in the body of the detailed description which follows with reference to the appended drawings, provided purely by way of non-limiting example, in which:

FIG. 1 is a schematic front elevational view of a hub cap according to the invention, FIG. 2 is a rear perspective view of the hub cap, FIG. 3 is a sectioned partial perspective view of the wheel, FIGS. 4, 5 and 6 are three perspective views on an enlarged scale, showing the application of the hub cap to the disc of the wheel in three successive phases, and FIGS. 7, 8 and 9 are three views in partial cross section taken on the lines VII—VII of FIG. 4, VIII—VIII of FIG. 5 and IX—IX of FIG. 6, respectively.

Referring initially to FIGS. 1 to 3, a motor vehicle wheel is generally indicated 10 and comprises a sheet metal disc 12 and a rim 14 attached to the circumferential edge of the disc 12 and arranged to receive a tire.

The disc 12 has a central recessed part 16 in which are formed four equi-angularly spaced, drawn holes 18 having raised edges which are connected to the outer face of the recessed part 16 by conical surfaces 20.

The holes 18 serve for the engagement of respective screws 22 by means of which the wheel 10 is fixed to the respective support of a motor vehicle. The screws 22 are of conventional type and each includes a screw-threaded shaft, not shown, and a head 24 connected to the shaft by means of a part 26 with a conical surface diverging towards the head 24.

The recessed part 16 of the disc 12 is also provided with four integral raised portions 28 which are equi-angularly spaced between the holes 18 and are formed by drawing.

A hub cap, generally indicated 30, is formed in a single piece from moulded plastics material and is releasably attached to the rim 12 in correspondence with the recessed part 16. The hub cap 30 comprises a disc 32 having a turned-back outer edge 34 with a diameter substantially corresponding to that of the side wall of the recessed part 16, and a skirt 36 projecting axially from the inner surface of the disc 32 at a certain distance from the edge 34. The skirt 36 has a plurality of axial slots 38 which divide it into a plurality of resilient sectors 40 (in the example illustrated, there are six) and at its free edge has a circumferential retaining tooth projection 42. The active surface of the retaining tooth 42, indicated 44, is of a conical form complementary to that of the conical surfaces of the connector parts 26 of the fixing screws 22.

The projection 42 is interrupted at four positions, which are angularly spaced like the raised portions 28 of the disc 16, by cuts or recesses 46 having a width equal to at least the width of the raised portions 28. As is clearly seen in FIGS. 3 and 4, each of the recesses 46 is defined at one end by a wall 48 which projects radially relative to the skirt 36 and at the opposite end by an inclined ramp surface 50.

The sectors 40 of the skirt 36 are surrounded circumferentially by a metal split-ring 52 which resists the radial expansion of the skirt 36, that is, outward resilient deformation of the sectors 40. The ring 52 is retained axially relative to the skirt 36 by positioning members 54 constituted, in the example illustrated, by pairs of rivets applied to the sectors 40 in angularly spaced positions.

By virtue of the configuration described above, the hub cap 30 is connected to the disc 16 of the wheel 10 by a bayonet-type connection using the fixing screws 22, which makes the operations of fitting and removing the hub cap itself particularly simple and convenient. Indeed, the attachment is achieved by placing the hub cap 30 in correspondence with the recessed part 16 and locating the recesses 46 of the skirt 36 initially in angular correspondence with the screws 22 in the manner illustrated in FIG. 4. In this position, the retaining projection 42 bears against the raised portions 28 and the hub cap 30 is in the raised position relative to the bottom of the part 16, as illustrated in FIG. 7.

Starting from this position, the hub cap 30 is rotated in an anticlockwise sense with reference to the drawings, to bring the retaining projection 42 into correspondence with the screws 22, whereby the resilient sectors 40 deform resiliently outwardly as a result of the force between this projection 42 and the zones of the frusto-conical parts 26 adjacent the heads 24 of the screws 22 (FIGS. 5 and 8).

This rotation being continued, the recesses 46 engage the raised portions 28 and the portions of the retaining projection 42 which follow the recesses 46 in this sense of rotation of the hub cap 30 slide along the frusto-conical parts 26 towards the bottom of the recessed part 16, coming to bear between the heads 24 and the part 20 as a result of the resilient inward return movement of the sectors 40 (FIGS. 6 and 9). The hub cap 30 is thus firmly locked in this position by virtue of the action exerted by the resilient ring 52.

For its removal, it suffices to rotate the hub cap 30 in the opposite sense, that is, in the clockwise sense with reference to the drawings, disengaging the recesses 46 from the raised portions 28 by virtue of the presence of the ramp 50, and bringing the recesses 46 back into angular correspondence with the screws 22, which allows the axial removal and hence the separation of the hub cap 30 from the disc 12.

From the above it is clear that the fitting and removal of the hub cap 30 may be effected extremely easily and conveniently with a minimum of manual force and without the need to use special tools or manipulate the fixing screws 22.

Naturally, the scope of the present invention extends to embodiments which achieve equal utility by using the same innovative concept.

What is claimed is:

1. A disc wheel assembly for motor vehicles and of the type including a disc provided with a plurality of equiangularly spaced holes through which a corresponding number of screws are received for attaching the assembly to the vehicle, with each screw having a diverging conical surface, and a hub cap detachably secured to the disc, which assembly comprises:

(a) the wheel disc including a plurality of raised portions corresponding to the number of holes and equiangularly spaced therebetween;
(b) the hub cap including a cylindrical skirt defined by a plurality of discrete axially directed resilient sectors, each sector terminating in a free end;
(c) the free ends of the sectors including a plurality of radially inwardly directed retaining projections and a plurality of recesses spaced between the projections, with each recess being of a circumferential width at least equal to the circumferential width of each raised portion;
(d) whereby the retaining projections engage the raised portions in one position of rotation of the hub cap, and the recesses engage the raised portions in a second position of rotation of the hub cap; and
(e) means for resiliently biasing the sectors radially inwardly for urging the retaining projections into engagement against the conical surfaces of the screws when the hub cap is disposed in the second position of rotation.

2. The disc wheel assembly of claim 1 wherein each recess includes an inclined ramp surface at one end thereof.

3. The disc wheel assembly of claim 1 wherein each retaining projection includes a surface having a configuration that is complementary to the configuration of the conical surface of each screw.

4. The disc wheel assembly of claim 1 wherein the means for resiliently biasing the retaining projections inwardly includes a resilient circumferential member surrounding the cylindrical skirt of resilient sectors.

5. The disc wheel assembly of claim 4 wherein the circumferential member includes a metal split-ring and the resilient sectors are provided with means for axially positioning the split-ring.

6. The disc wheel assembly of claim 1 wherein each of the spaced holes includes a peripheral raised edge engageable by the conical surface of each screw and defining an area therebetween for engagement by a retaining projection.

7. The disc wheel assembly of claim 1 wherein the hub cap is integrally formed from molded plastic material.

* * * * *